(12) United States Patent
Fujii et al.

(10) Patent No.: US 6,415,102 B1
(45) Date of Patent: Jul. 2, 2002

(54) IMAGING APPARATUS

(75) Inventors: Tadashi Fujii; Masahiro Konishi; Chiaki Ichikawa; Kaname Nihei; Koichi Yahagi; Hiroshi Igarashi, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/311,290

(22) Filed: May 14, 1999

(30) Foreign Application Priority Data

May 14, 1998 (JP) .......................................... 10-148285

(51) Int. Cl.[7] .............................................. H04N 5/225
(52) U.S. Cl. ........................ 386/117; 348/207; 348/231
(58) Field of Search ......................... 386/38, 117, 120, 386/121; 358/906, 909.1; 348/207, 231–233

(56) References Cited

U.S. PATENT DOCUMENTS

| | | | | |
|---|---|---|---|---|
| 5,027,214 A | * | 6/1991 | Fujimori | ..................... 348/233 |
| 5,153,730 A | * | 10/1992 | Nagasaki et al. | ........... 348/231 |
| 5,610,723 A | * | 3/1997 | Yamagishi | ................... 386/121 |
| 5,633,976 A | * | 5/1997 | Ogino | ........................ 386/120 |

FOREIGN PATENT DOCUMENTS

JP A6- 86203 3/1994

* cited by examiner

Primary Examiner—Thai Tran
Assistant Examiner—Christopher Onuaku
(74) Attorney, Agent, or Firm—Birch, Stewart, Kolasch & Birch

(57) ABSTRACT

In a digital camera in which image data produced through a photographing operation is compressed to be written in a memory card, even if a shutter release button is depressed during the recording of the image data in the memory card, the photographing can be immediately achieved. While image data stored in a buffer memory is being compressed to be stored in the memory card, the depression of shutter release button is continuously monitored. If the release button is pressed, the recording operation in the memory card is interrupted to conduct the photographing. After the photographing is finished, the image data for which the recording is interrupted is compressed to be entirely written in the memory card beginning at the start point thereof.

6 Claims, 5 Drawing Sheets

*Fig. 2*

```
REM      COUNT
22       [100]

BUF
12
```

IMAGING APPARATUS

BACKGROUND OF THE INVENTION

1. Field of the Invention

The present invention relates to an imaging device such as a digital camera of card recording type.

2. Description of the Prior Art

A digital camera or an electronic camera includes an imaging device such as a charge coupled device (CCD). When shooting a subject with such a camera, an optical image of the subject is formed through an imaging lens system and is then converted by the imaging device into an image signal. The signal is thereafter transformed into digital image data to be recorded on a recording medium, for example, a memory card.

To record a frame of digital image data on a recording medium, about three to about four seconds are required when the data is not compressed. In general, the shooting operation is inhibited during the data recording operation. Therefore, most digital cameras are provided with an operation sequence in which when a shutter release button is depressed during the data recording, the shooting operation starts after the recording is completed. Consequently, a good shutter releasing chance is lost depending on cases.

To remove the problem, Japanese Patent Laid-Open Publication No. 6-86203 describes an electronic camera in which when a shutter release button is pressed during an image data recording operation, the data recording is temporarily interrupted. Thereafter, image signals are read from an imaging device and are then converted into digital image data to be once stored in a memory (shooting operation). After the shooting operation is finished, the recording of image data interrupted is restarted to record the data on a recording medium.

When the recording of one frame of image data on a recording medium is interrupted, part of image data of the frame is already recorded on the medium. When the recording operation is restarted after the shooting operation, remaining part of image data is recorded on the medium. However, the technology of the publication takes little account of compression of image data.

SUMMARY OF THE INVENTION

It is therefore an object of the present invention to provide an imaging apparatus in which when a shutter release button is pressed even during the compression of the image data obtained by shooting or the recording of the compressed image data on a recording medium, the shooting operation can be immediately started, and the image data obtained by the shooting can be compressed to be recorded on a recording medium after the shooting operation.

Another object of the present invention is to provide an imaging apparatus having a sequential or continuous image shooting function in which the continuous image shooting can be appropriately controlled.

In accordance with the present invention, there is provided an imaging apparatus including imaging means (an imaging device) for producing image data representing an optical image of an object, temporary storage means (a temporary storage device) for storing the image data attained from the imaging means, recording means (a recording device) for compressing one frame of image data stored in the temporary storage means and for writing the compressed image data on a recording medium, input means (an input device) for inputting an imaging instruction, and control means (a control device) for checking, while the recording means is compressing the image data and writing the compressed image data on the recording medium, to determine whether or not an imaging instruction is inputted from the input means, for controlling the recording means to interrupt the compression and write operation if an imaging instruction is inputted, and for storing the image data attained from the imaging means in the temporary storage means. After the image data from the imaging means is stored in the temporary storage means, a check is made to determine whether or not an imaging instruction is inputted from the input means. If an imaging instruction is not inputted, the data compression and the writing of image data on the recording medium are conducted for the frame of the image data stored in the temporary storage beginning always at a first point of the frame.

In accordance with the present invention, when a photographing instruction is inputted while the image data stored in the temporary storage means is being written through compression on a recording medium, the compression and write operation is immediately interrupted to initiate a photographing operation. Therefore, the user can photograph desired objects to obtain image data thereof without losing a good shutter releasing chance.

For image data which cannot be completely recorded on the medium due to the interruption of the write operation, a compression and write operation is carried out beginning at a start point of one frame of image data after the photographing is finished. The compression of one frame of image data and the recording of the compressed image data on the medium can be accomplished in a relatively short period of time, e.g., within one second. Consequently, even when one frame of image data is written on the medium beginning at the first portion thereof, the recording operation can be completed at once.

In accordance with the present invention, there is provided an imaging apparatus having a continuous shooting (shot) or photographing function including imaging means (an imaging device) for producing image data representing an optical image of an object, temporary storage means (a temporary storage device) having a storage capacity of storing a plurality of frames of image data for storing the image data attained from the imaging means, recording means (a recording device) for compressing one frame of image data stored in the temporary storage means and for writing the compressed image data on a recording medium, input means (an input device) for inputting an imaging instruction, and continuous shot control means (a continuous shot control device) for conducting, as long as an input instruction is inputted from the input means, a control operation to repeatedly achieve the storage operation of the image data from the imaging means in the temporary storage means. When the image data stored in the temporary storage means reaches a maximum storable amount of the temporary storage means or when the sum of the image data stored in the temporary storage means and the image data already recorded on the recording medium reaches a maximum storable amount of the recording medium, the sequential shot control means inhibits a photographing operation.

In accordance with the present invention, the continuous photographing operation is controlled in consideration of the number of frames already photographed and stored in the temporary storage means and on the recording medium and the number of frames recordable on the medium. In consequence, all image data produced by the photographing can be stored on the recording medium without overflow of data.

In accordance with one embodiment of the present invention, the imaging apparatus further includes display means (a display device) for displaying the storable amount of the temporary storage means as a number of frames for continuous shot. The display means restricts the number of frames for continuous shot in accordance with a recordable amount of the recording medium, the recordable amount remaining in the recording medium if the image data stored in the temporary storage means is recorded on the recording medium.

The sequential or continuous photographing is possible within the recording capacity of the recording medium. The number of recordable frames is appropriately displayed for the continuous photographing.

BRIEF DESCRIPTION OF THE DRAWINGS

The objects and features of the present invention will become more apparent from the consideration of the following detailed description taken in conjunction with the accompanying drawings in which:

FIG. 2 is a diagram showing displayed information;

DESCRIPTION OF THE PREFERRED EMBODIMENTS

Figure 1:
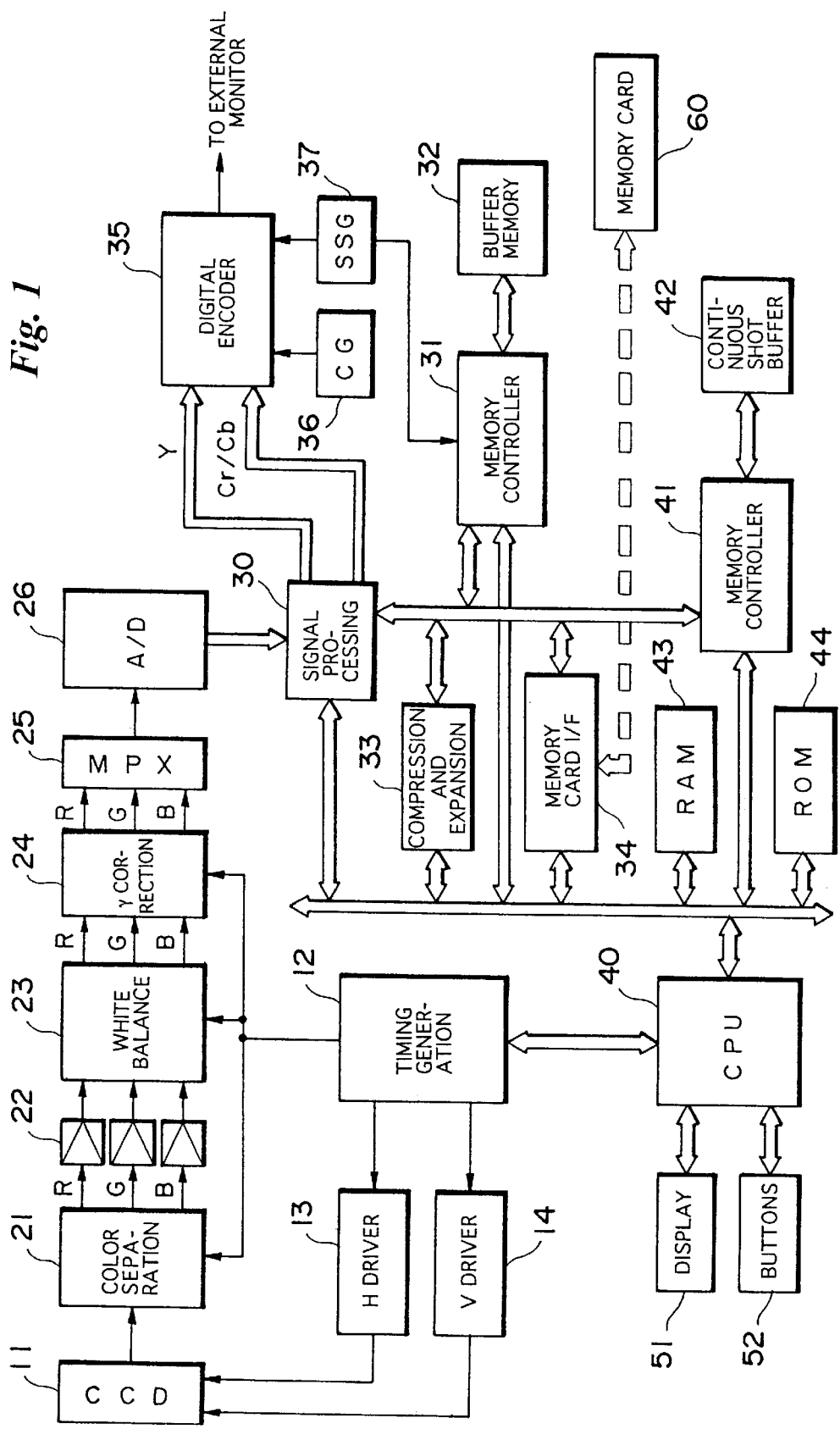
FIG. 1 is a block diagram showing an electric configuration of a digital camera.

Referring to FIG. 1, description will be given of a digital camera having a continuous (sequential, successive or consecutive) photographing function.

FIG. 1 shows in a block diagram of an electronic construction of the digital camera.

The camera includes a CCD 11 to transform an optical image of an object formed by an imaging lens system, not shown, into an image signal and a timing generator 12 to generate timing signals such as a horizontal sync signal $H_D$, a vertical sync signal $V_D$ and a sampling clock signal. The horizontal sync signal $H_D$ and the vertical sync signal $V_D$ are fed to an H driver 13 and a V driver 14, respectively, which drive the CCD 11.

Additionally, the horizontal sync signal $H_D$, the vertical sync signal $V_D$ and the sampling clock signal are delivered to a color separation circuit 21, a white balance circuit 23 and a γ correction circuit 24. The CCD 11 includes color filters to produce color pictures and sends the image signal to the color separator 21, which produces image signals of three primary colors, red (R), green (G) and blue (B) signals. These signals are amplified by a preamplifier 22 and then undergo color adjustment and γ correction through the white balance circuit 23 and the γ corrector 24, respectively.

RGB signals from the γ corrector 24 are transformed by a multiplexer 25 into color-sequential signals associated with color arrangement of the CCD 11 and then are fed to an analog-to-digital (A/D) converter 26. Digital image data from the A/D converter 26 is sent to a subsequent stage including a signal processing system and a signal recording and reproducing system.

These systems include two memory controllers 31 and 41 respectively coupled with a buffer memory (for compression and expansion of data) 32 and a continuous photographing buffer (memory) 42. Controllers 31 and 41 control reading and writing of image data for the memories 32 and 42, respectively. Each of the memories 32 and 42 is a dynamic random access memory (DRAM).

The memory controllers 31 and 41 are controlled by a central processing unit (CPU) 40, which is linked with a static random access memory (SRAM) 43 and a flash read-only memory (ROM) 44. The SRAM 43 is a work memory for the CPU 40, and the ROM 44 stores various programs for the CPU 40.

The CPU 40 controls sequences of imaging, recording and reproducing operations in accordance with user's instructions from a shutter release button, a mode setting button and other buttons 52. The CPU 40 displays on a liquid-crystal display (LCD) 51 information such as the number of frames recordable in a card, a frame sequential number, and the number of frames for continuous photographing, which will be described later.

In a preview mode, the RGB image data from the A/D converter 26 is once stored in the buffer memory 32 via a signal processing circuit 30. The data is then read therefrom to be processed by the signal processing circuit 30 into Y/C color difference data, which is again stored in the memory 32. Thereafter, the data is read therefrom and is sent via the signal processing circuit 30 to a digital encoder 35. In this connection, a character generator 36 generates image signals indicating information such as a frame number, date and time and a sync signal generator 37 generates synchronizing signals. The digital encoder 35 converts the Y/C image data into a video signal in an analog form and superimposes a character image signal and a sync signal onto the analog video signal. A video signal thus produced from the encoder 35 is delivered via a terminal to an external monitor.

In a mode of shooting (including the continuous shooting operation), the RGB image data is outputted from the A/D converter 26 and is written in the memory 32 in response to depression of the shutter release button. The same image data is read from the memory 32 to be also written in the continuous shot buffer 42. In the continuous shot, image data attained by shooting operations is sequentially written in the buffer 42.

In a recording mode, the RGB image data in the memory 32 is transformed by the signal processing circuit 30 into the Y/C image data to be returned to the memory 32. Moreover, the Y/C image data is read from the memory 32 and is then compressed by a compressing and expanding circuit 33 to be recorded in a memory card 60 via a memory card interface 34 in sector-by-sector fashion.

The image data written in the buffer 42 in the continuous shot is transferred to the memory 32 in frame-by-frame manner. The data is then recorded in the memory card 60 as described above.

In a reproduction mode, the compressed image data is read via the memory card interface 34 from the memory card 60 to be expanded by the compressing and expanding circuit 33. The expanded image data is stored in the memory 32 and is then processed by the signal processing circuit 30 and the encoder 35 to be outputted as an analog video signal to an external device.

Figure 2:
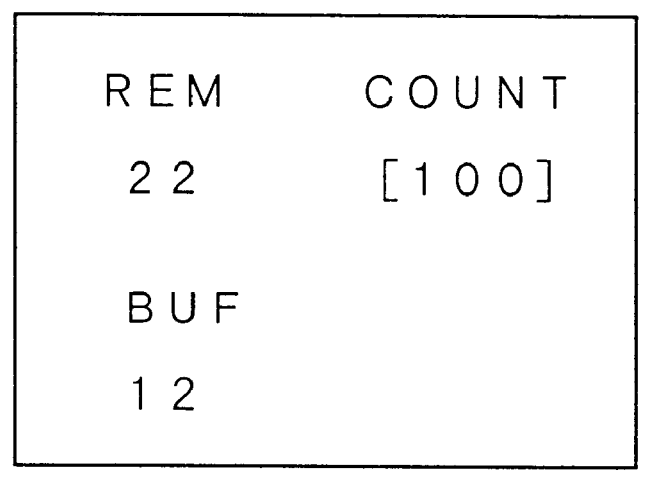

FIG. 2 illustratively shows information presented by an LCD.

Numerals, "22" in this example, displayed below letters "REM" denote the number of frames recordable in the card. Numerals, "100" in this example, presented below letters "COUNT" indicate a sequence number of frame, i.e., a serial number of frame for a subsequent shot in the memory card. This example indicates that 121 frames of compressed image data can be inherently recorded in the memory card 60, 99 frames of such data have already been written in the memory card 60, the next shooting will be the one-hundredth frame, and hence 22 frames of data can be further recorded in the memory card 60.

Numerals, "12" in this example, displayed below letters "BUF" denote the number of frames for continuous photographing. In this example, since the continuous shot buffer 42 has a capacity of 12 frames of RGB image data, a maximum of 12 frames are possible for continuous photographing.

When one frame of image data in the buffer memory 32 or the continuous shot buffer 42 is compressed and resultant image data is completely written in the memory card 60, one is subtracted from the value of number of frames recordable in a card (REM) and one is added to the value of the sequential number of frame (COUNT).

When one frame is shot (including the sequential shooting), one is subtracted from the value of sequential shot frames (BUF). When the image data (in the continuous shot buffer 42) is recorded in the memory card 60, one is added to the value of sequential shot frames (BUF).

To display the number of frames for continuous photographing (BUF), the CPU 40 comparatively checks the number of frames still recordable in the memory card 60 and the number of frames of image data stored in the buffer 42. In this regard, the displayed number of frames for continuous photographing (BUF) is basically the number of frames of image data which can be stored in the continuous shot buffer 42 (the number of frames obtained by subtracting the number of frames already stored in the buffer 42 from the maximum number of frames recordable in the buffer 42). However, the displayed number of frames for continuous photographing (BUF) is restricted by a condition of the number frames of image data which can be recorded in the memory card 60 if the number of frames of image data already stored in the buffer 42 are recorded in the memory card 60. If the number of frames (number of frames of absolute difference) attained by subtracting the sum of the number of frames already recorded in the memory card 60 and the number of frames already stored in the buffer 42 from the maximum number of frames recordable in the memory card 60 is less than the number of frames which can be stored in the buffer 42 at the pertinent point, the obtained number of frames (of the absolute difference) is displayed as the number of frames for continuous photographing (BUF).

Figure 3:
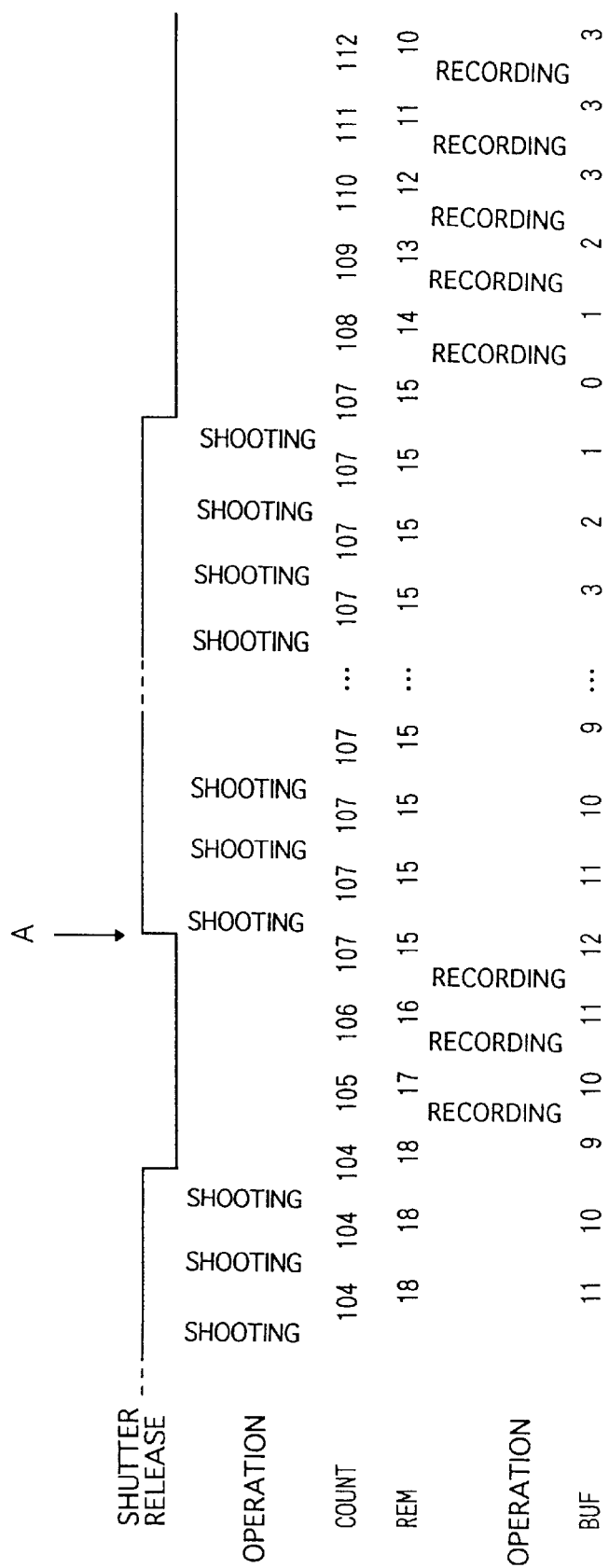
FIG. 3 is a diagram illustratively showing a change in display information items including the number of frames for continuous photographing.

Assume that the number of frames recordable in the card (REM) is 15 and the number of frames for continuous shot (BUF) is 12 at a point indicated by an arrow A as shown in FIG. 3. If a continuous shooting of 12 frames is thereafter accomplished, the number of frames for continuous shot (BUF) becomes 0. After the continuous shooting is completed, the recording operation is started. Image data of the buffer 42 is compressed in frame-by-frame fashion to be recorded in the memory card 60. If the 12 frames of image data in the buffer 42 are recorded in the memory card 60, there remains an area in the memory card 60 only for three frames of image data. Therefore, even when the buffer 42 has an area for four or more frames of image data, "3 frames" is displayed as the number of frames for continuous shot (BUF).

In place of the number of frames recordable in the card (REM), there may be presented a value obtained by adding the number of frames of data stored in the buffer 42 to the above number of frames recordable in the card (REM). This is also applicable to the sequential number of frame (COUNT).

In an electronic camera in which the shooting is enabled if the continuous shot buffer 42 has an available area even after the memory card 60 is full of image data, the number of frames for the available area of the buffer 42 may be displayed as the number of frames for continuous shot (BUF) in any situation.

Figure 4:
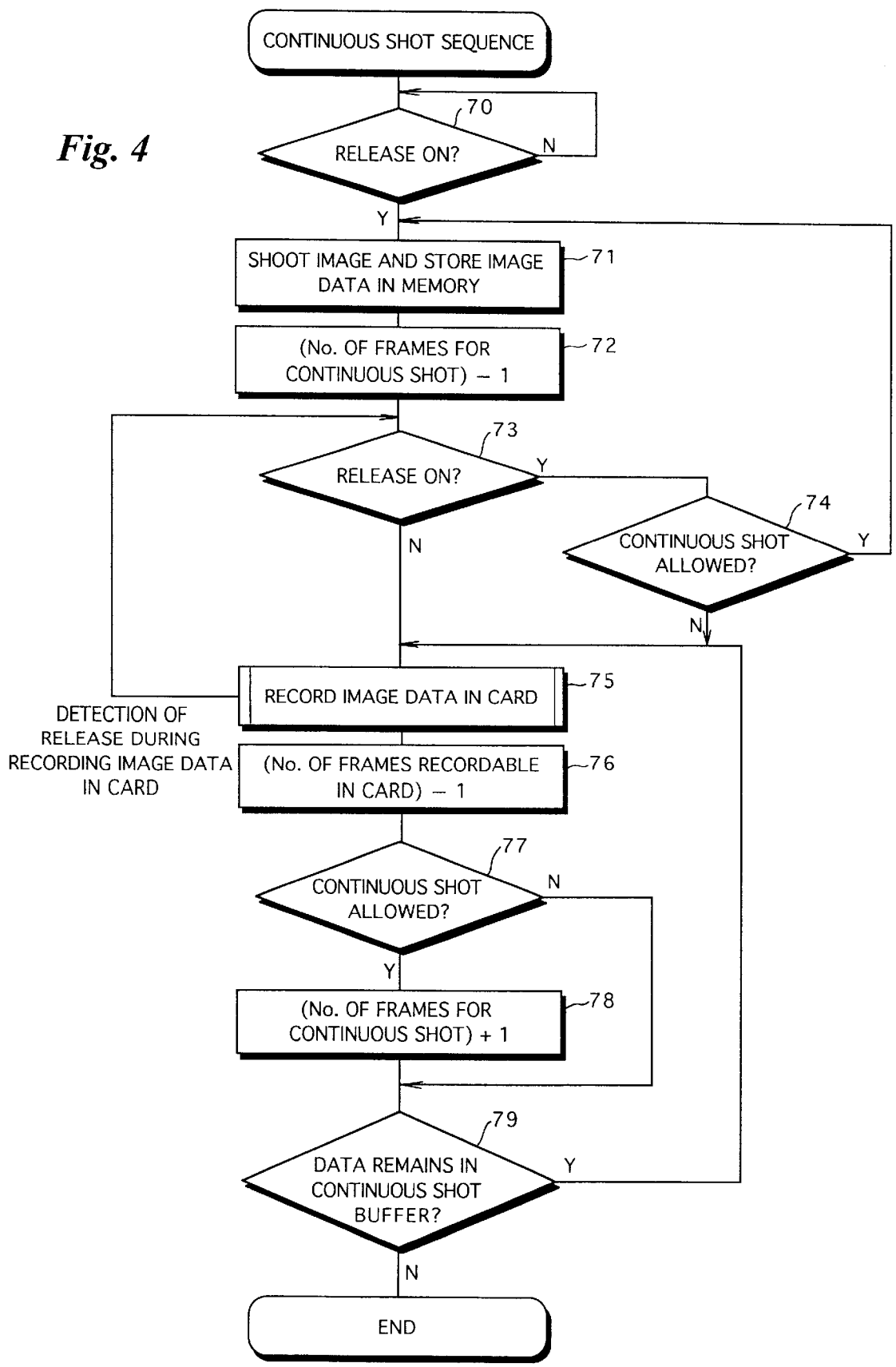
FIG. 4 is a flowchart showing a sequence of continuous photographing operations.

FIG. 4 shows a processing procedure of the CPU 40 in the continuous shooting operation of the digital camera configured as above. The SRAM 43 includes an area used as a counter for the number of frames recordable in a card and an area used as a counter for the number of frames for continuous shot. The contents of the counters are reflected in the presentation of the number of frames recordable in a card (REM) and the number of frames for continuous shot (BUF).

If the shutter release button is on (kept depressed; YES at step 70), a shooting operation is conducted and image data obtained as a result is fed to and stored in the continuous shot buffer 42 (step 71). One is subtracted from the value of counter for the number of frames for continuous shot (step 72).

As long as the shutter release the button is on (YES at step 73) and the continuous shot is allowed (YES at step 74), processing of steps 71 and 72 is repeatedly executed at a predetermined interval of time.

Possibility of continuous shot is determined at step 74 on the basis of two conditions as follows.

Condition 1 is whether or not the buffer 42 has an area to store at least one frame of image data.

Condition 2 is whether or not the number of frames of image data stored in the buffer 42 is less than that of frames of image data which can be still recorded in the memory card 60.

If the conditions 1 and 2 are satisfied, the continuous shooting is allowed. If either one thereof is not satisfied, the continuous shot operation is inhibited.

When the shutter release button becomes off or when the continuous shot is inhibited as above, the system enters the recording mode.

Each frame of the image data is sequentially recorded in the memory card 60 (step 75), which will be described later. When one frame of image data is compressed and is then recorded in the memory card 60, one is subtracted from the counter for the number of frames recordable in the card (step 76). A check is again made to determine whether or not the continuous shot is allowed (step 77). If possible, one is added to the counter for the number of frames for continuous shot (step 78); otherwise, the continuous shot counter is kept unchanged and the display of the number of frames for continuous shot (BUF) is not updated as described for the example above.

If image data still remains in the buffer 42 (YES at step 79), process returns to again step 75. Namely, one frame of image data of the buffer 42 is compressed to be written in the memory card 60.

When the shutter release button is pressed during the operation in which the image data in the buffer 42 is compressed or is written in the memory card 60, control returns to step 73. If the continuous shot is allowed (step 74), a continuous shooting operation is achieved (steps 71 and 72).

Figure 5:
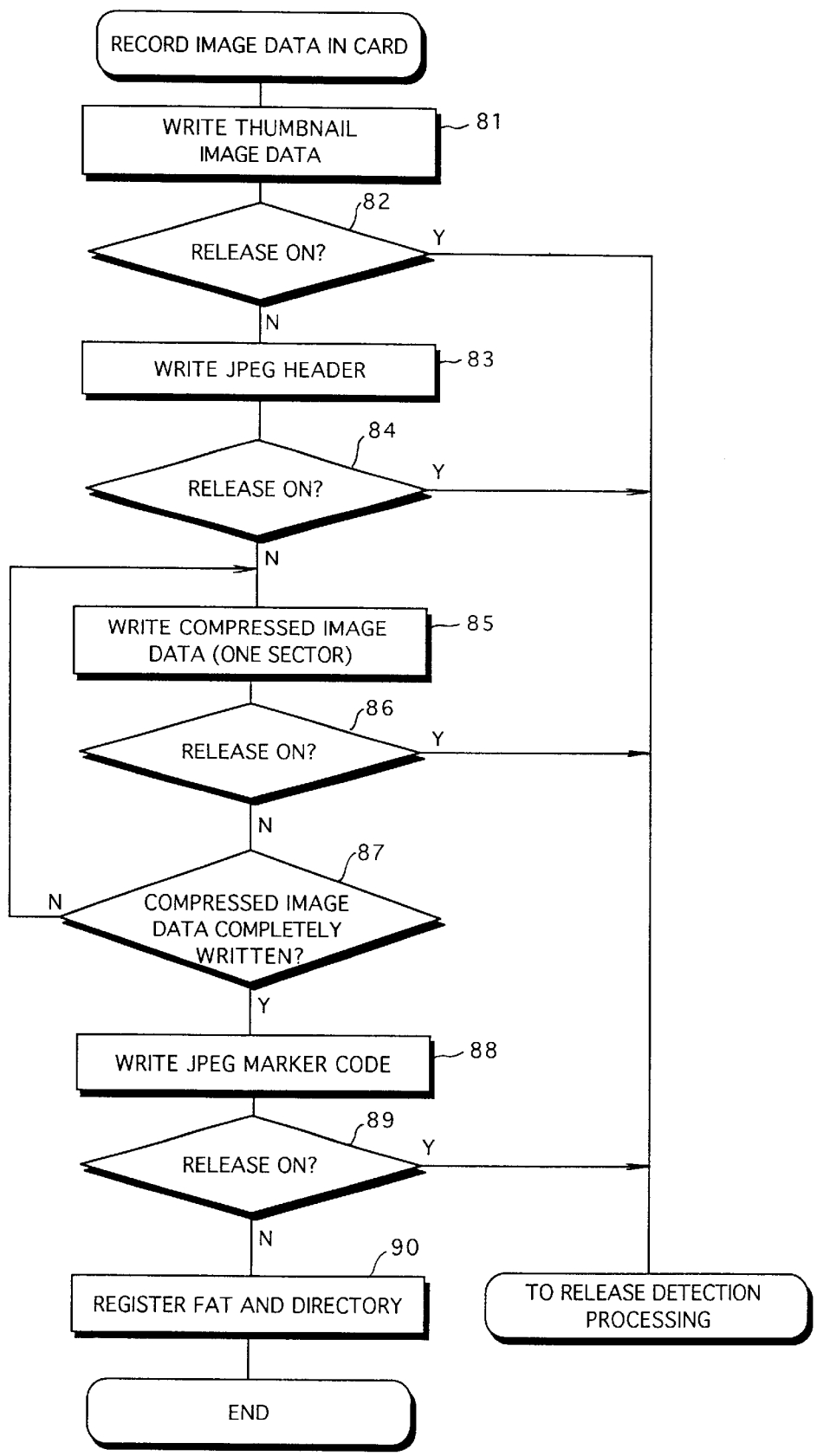
FIG. 5 is a flowchart showing operation to write information in a memory card.

FIG. 5 shows a procedure of processing to record data in the memory card 60 by the CPU 40 (FIG. 4, step 57). The data recording procedure is basically as follows.

When one frame of image data is compressed and the compressed image data is completely written in the memory card 60, the image data is registered to a file allocation table (FAT) and a directory in the memory card 60. This completes the recording of one frame of image data in the memory card 60. Namely, the image data recorded in the memory card 60 is thereafter regarded as effective.

When the shutter release button is depressed during the recording of image data in the memory card 60, the card recording operation is immediately interrupted at the pertinent point. The card recording is incomplete and the registration of the FAT and the directory is skipped. Part of image data of the frame already written in the memory card 60 remains therein. However, in a subsequent card recording operation, a frame of image data is written over the remaining data (overwriting of the image data).

Thumbnail image data or reduced image data of one frame of RGB image data of the buffer 42 to be recorded in the memory card 60 (the thumbnail image data is produced, for example, through a thinning out operation) is first written in the memory card 60 (step 81).

Thereafter, whether or not the shutter release button is on is determined (step 82). The state of shutter release button can be sensed by a key scan routine, an interruption routine, or other known processing.

If the release button remains off, a JPEG header is written in the memory card 60 for a frame of image data (step 83).

The state of shutter release button is again examined (step 84).

If the release button is off, image data is read from the buffer 42 to be then compressed by the compressing and expanding circuit 33 in sector-by-sector fashion. Each sector (a unit of MS-DOS file format) of compressed image data is sequentially written in the memory card 60 (step 85).

Each time one sector of image data is written in the memory card 60, the state of the shutter release button is inspected. As long as the release button is off (step 87), the compression of image data and the writing of image data in the memory card 60 are repeatedly conducted until one frame of image data is entirely written in the memory card 60 (step 85).

When the compression and writing of image data is completely carried out, a JPEG marker code is written in the memory card 60 (step 88).

Thereafter, if the shutter release button is off (step 89), the registration of the FAT and the directory is achieved to the memory card 60 for the frame of image data written therein (step 90).

Each time information is written in the memory card 60 or each time one sector of compressed image data is written in the memory card 60, the state of shutter release button is inspected. Therefore, the shooting operation can be immediately conducted in response to depression of the shutter release button.

If the shutter release button is on (YES at steps 82, 84, 86 and 89), process goes from step 73 (YES at step 73) via step 74 to steps 71 and 72.

In FIG. 4, when the shutter release button becomes off (NO at step 73), control is passed again to the card recording operation. For one frame of image data of which the recording operation has been interrupted before, the recording operation is achieved for all image data beginning at the first step thereof (processing starts at step 81 of FIG. 5). Of the image data in the buffer 42, the frames thereof already recorded in the memory card 60 is naturally memorized by the CPU 40.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An imaging apparatus, comprising:
   an imaging device producing image data representing an optical image of an object;
   a temporary storage device storing the image data attained from said imaging device;
   a recording device compressing one frame of image data stored in said temporary storage device and writing the compressed image data on a recording medium;
   an input device inputting an imaging instruction; and
   a controller for checking, while said recording device is compressing the image data and writing the compressed image data on the recording medium, to determine whether or not an imaging instruction is inputted from said input device, controlling said recording device to interrupt the compression and write operation if an imaging instruction is inputted, and storing the image data attained from said imaging device in said temporary storage device, wherein:
   after the image data from said imaging device is stored in said temporary storage device, a check is made to determine whether or not an imaging instruction is inputted from said input device;
   if an imaging instruction is not inputted, the data compression and the writing of image data on the recording medium are conducted for the frame of the image data stored in said temporary storage device beginning always at a first point of the frame.

2. The imaging apparatus in accordance with claim 1, further including a continuous shot control device conducting, as long as an input instruction is inputted from said input device, a control operation to repeatedly achieve the storage operation of the image data from said imaging device in said temporary storage device.

3. The imaging apparatus in accordance with claim 2, wherein said temporary storage device has a capacity of storing a plurality of frames of image data, and
   when the image data stored in said temporary storage device reaches a maximum storable amount of said temporary storage device or when the sum of the image data stored in said temporary storage device and the image data already recorded on the recording medium reaches a maximum storable amount of the recording medium, said continuous shot control device inhibits a photographing operation.

4. The imaging apparatus in accordance with claim 3, further including a display device displaying the storable amount of said temporary storage device as the number of frames for continuous shot, wherein
   said display device restricts the number of frames for continuous shot in accordance with a recordable amount of the recording medium, the recordable amount remaining in the recording medium if the image data stored in said temporary storage device is recorded on the recording medium.

5. An imaging apparatus, comprising:
   an imaging device producing image data representing an optical image of an object;
   a temporary storage device having a storage capacity of storing a plurality of frames of image data and storing the image data attained from said imaging device;

a recording device compressing one frame of image data stored in said temporary storage device and writing the compressed image data on a recording medium, said temporary storage device and said recording medium being different from each other;

an input device inputting an imaging instruction; and a continuous shot control device conducting, as long as an input instruction is inputted from said input device, a control operation to repeatedly achieve the storage operation of the image data from said imaging device in said temporary storage device, wherein said continuous shot control device inhibits photographing operation in both the case in which the image data stored in said temporary storage device reaches a maximum storable amount of said temporary storage device and the case in which the sum of the image data stored in said temporary storage device and the image data already recorded on the recording medium reaches a maximum storable amount of the recording medium.

6. The imaging apparatus in accordance with claim 5, further including a display device displaying the storable amount of said temporary storage device as the number of frames for continuous shot, wherein said display device restricts the number of frames for continuous shot in accordance with a recordable amount of the recording medium, the recordable amount remaining in the recording medium if the image data stored in said temporary storage device is recorded on the recording medium.

* * * * *